Patented Sept. 10, 1946

2,407,508

UNITED STATES PATENT OFFICE 2,407,508

UNSATURATED BICYCLIC CARBONYLIC COMPOUNDS AND THEIR PREPARATION

Rupert C. Morris, Berkeley, and Edward C. Shokal, Oakland, Calif., assignors to Shell Development Company, San Francisco, Calif., a corporation of Delaware No Drawing. Application April 26, 1944,
Serial No. 532,902

6 Claims. (Cl. 260—586)

This invention relates to unsaturated bicyclic carbonylic compounds and to a method for their preparation. More specifically the present invention pertains to certain novel bicyclic heptenes and to a method for their preparation which comprises reacting methacrolein or methyl isopropenyl ketone with cyclopentadiene.

This application is a continuation-in-part of co-pending application, Serial Number 441,878, filed May 5, 1942.

The novel compounds of the invention may be readily prepared in good yields by reacting a compound having the general formula

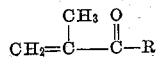

wherein R represents a hydrogen atom or a methyl group, with cyclopentadiene in accordance with the general equation:

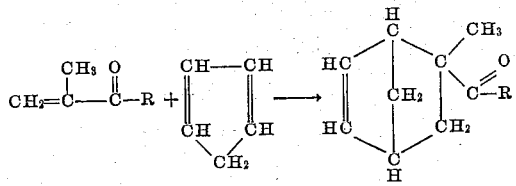

Thus, 2-methyl, 2-formyl, bicyclo (2,2,1) heptene-5,6 may be prepared by reacting approximately equivalent amounts of methacrolein and cyclopentadiene, preferably in the presence of an oxidation inhibitor such as hydroquinone or tert-butyl catechol. The reaction may be carried out at atmospheric pressure or at superatmospheric pressures and in either the liquid or vapor phase. The reaction temperatures may vary from between about 50° C. and about 175° C., preferably between about 90° C. and about 110° C. in liquid phase operation. Under these circumstances the mono-olefinic compound, i. e. the methacrolein, adds to the cyclic conjugated diene to form an unsaturated bicyclic compound which may be separated from the reaction mixture by any suitable means, as by distillation under diminished pressure. 2-methyl, 2-acetyl, bicyclo (2,2,1) heptene-5,6 may be readily prepared by reacting cyclopentadiene with methyl isopropenyl ketone in a similar manner.

The novel compounds of the invention possess unique properties which distinguish them from the related compounds which are already known to the art. 2-methyl, 2-formyl, bicyclo (2,2,1) heptene-5,6, for example, has very different properties from its lower homologue which may be prepared by the condensation of acrolein with cyclopentadiene, i. e. 2-formyl, bicyclo (2,2,1) heptene-5,6. It is also quite different in properties from its isomer, 2-formyl, 3-methyl, bicyclo (2,2,1) heptene-5,6 which may be formed by the condensation of crotonaldehyde with cyclopentadiene. This difference, which is unobvious and is not merely a difference in degree which might reasonably be expected from the fact that the unsaturated aldehyde of the invention is a higher homologue or an isomer of the two other named compounds, is clearly shown by a comparison of the physical and chemical properties of these three compounds. Thus, the herein described novel compound, 2-methyl, 2-formyl, bicyclo (2,2,1) heptene-5,6, is a solid having a melting point of between about 62° C. and about 65° C., while its lower homologue, 2-formyl, bicyclo (2,2,1) heptene-5,6, which differs from it by a single methyl group, is a liquid boiling at between about 72° C. and about 74° C. at 20 mm. pressure, and its isomer, 2-formyl, 3-methyl, bicyclo (2,2,1) heptene-5,6, which is prepared by adding crotonaldehyde to cyclopentadiene, is a liquid boiling between about 98° C. and about 100° C. at a pressure of 50 mm. There is also a marked difference in the odor and appearance of these three compounds of the same homologous series. The presently described novel compound, i. e. 2-methyl, 2-formyl, bicyclo (2,2,1) heptene-5,6, is a white crystalline material having a camphor-like appearance, as is its hydrogenated derivative, 2-methyl, 2-hydroxymethyl, bicyclo (2,2,1) heptane, which has a pleasant odor resembling that of camphor. The lower homologue, 2-formyl, bicyclo (2,2,1) heptene-5,6, and the isomer, 2-formyl, 3-methyl, bicyclo (2,2,1) heptene-5,6, are, on the other hand, substances which are not at all camphor-like in their physical properties, since they are liquids and have a comparatively disagreeable odor.

There is also a marked difference in chemical properties between the presently disclosed bicyclic carbonylic compounds and the hereinabove described related compounds. This difference is attributable principally to the fact that the number 2 carbon atom of the cyclic structure is a quaternary carbon atom in the case of the compounds of the invention, whereas in the related compounds, e. g. 2-formyl, bicyclo (2,2,1) heptene-5,6 and 2-formyl, 3-methyl, bicyclo (2,2,1) heptene-5,6, the number 2 carbon atom is attached to but three other carbon atoms. This fact imparts a unique reactivity to the carbonyl group and enables the use of the compounds of the invention in the synthesis of a variety of structurally related compounds. For example, the herein described novel aldehyde, because of its quaternary structure, is suitable for use in the preparation of structurally related alcohols and acids via the Cannizaro reaction, whereas the homologue and the isomer referred to above are not suited for such use. The compounds of the invention may also be readily hydrogenated to form a series of other useful compounds. This hydrogenation process may be carried out selectively by reacting the unsaturated carbonylic compound with elementary hydrogen in the presence of a hydrogenation catalyst, as described in the co-pending application of Morris and Evans, Serial Number 434,114, filed March 10, 1942, to reduce the carbon-carbon double bond of the cyclic system and form a saturated carbonylic compound. However, if desired, the unsaturated carbonylic compounds may be completely reduced to form the corresponding saturated alcohols.

The unique and distinctive properties of the compounds of the invention enable their application to a variety of uses to which closely related carbonylic compounds may not be put. For example, since the presently disclosed bicyclic aldehyde and its hydrogenated derivatives have physical properties so closely resembling those of camphor, they may be advantageously used in many instances as camphor substitutes. They are particularly well suited for use as substitutes for camphor in medicinal preparations, whereas their isomers and lower homologues are not in most cases suitable for such use. The presence of the methyl substituent in the bicyclic ring structure imparts further distinguishing properties to the claimed novel compounds which makes possible their application to other distinctive uses. It particularly influences the solubility characteristics of the said compounds and makes them more soluble in classes of substances in which the homologues or isomeric compounds are insoluble or but slightly soluble. The compounds are therefore useful as solvents for nitro-cellulose derivatives and for a variety of resinous materials. The unsaturated carbonylic compounds of the invention and/or their hydrogenated derivatives are also useful in the manufacture of Celluloid, films, explosives, lacquers, varnishes, moth and insect repellents, etc. The compounds are useful plasticizers which may be employed to advantage in adhesive compositions, aviation dopes and cementing agents, ceramic coatings, nail enamels and electrical insulation which contain cellulose esters, explosives, safety glass and coatings for a variety of substances including leather, metal, paper, rubber goods, stone and wood. They may therefore be incorporated as valuable constituents of such coating compositions as paints, varnishes, enamels, lacquers and the like.

The following examples illustrate the invention.

*Example I*

Approximately equimolecular quantities of cyclopentadiene and methacrolein together with a small amount of an inhibitor comprising hydroquinone were heated in a pressure vessel to a temperature of about 100° C. at a pressure of about 130 lbs. per sq. in. After a reaction period of about 10 hours, the reaction product was fractionated under diminished pressure. A good yield of the bicyclic aldehyde, 2-methyl, 2-formyl, bicyclo (2,2,1) heptene-5,6 was obtained. It boiled at 96° C. to 99° C. at 50 mm.

*Example II*

2-methyl, 2-acetyl, bicyclo (2,2,1) heptene-5,6 was prepared by heating approximately equivalent amounts of methyl isopropenyl ketone and cyclopentadiene in substantially the same manner as described in Example I. Distillation of the reaction mixture resulted in the isolation of a good yield of the desired unsaturated bicyclic ketone. This compound had a boiling point of between about 112° C. and about 113° C. at a pressure of 50 mm. of mercury.

We claim as our invention:

1. A compound having the general formula

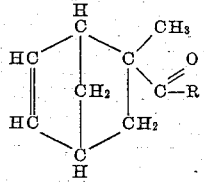

wherein R is a member of the group consisting of the hydrogen atom and the methyl radical.

2. 2-methyl, 2-formyl, bicyclo (2,2,1) heptene-5,6.

3. 2-methyl, 2-acetyl, bicyclo (2,2,1) heptene-5,6.

4. A method for the preparation of compounds having the general formula

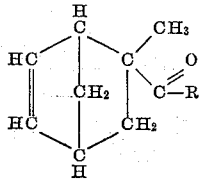

which comprises reacting cyclopentadiene with a compound having the general formula

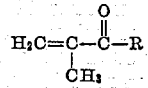

wherein R is a member of the group consisting of the hydrogen atom and the methyl radical.

5. A process for the production of 2-methyl, 2-formyl, bicyclo (2,2,1) heptene-5,6 which comprises reacting methacrolein with cyclopentadiene.

6. A process for the production of 2-methyl, 2-acetyl, bicyclo (2,2,1) heptene-5,6 which comprises condensing cyclopentadiene with methyl isopropenyl ketone.

RUPERT C. MORRIS.
EDWARD C. SHOKAL.